(12) United States Patent
Agbay et al.

(10) Patent No.: US 8,955,540 B2
(45) Date of Patent: Feb. 17, 2015

(54) VALVE LOCK ASSEMBLY

(75) Inventors: Anthony J. Agbay, Spencer, MA (US); John C. Mahaney, Spencer, MA (US)

(73) Assignee: Inner-Tite Corp., Holden, MA (US)

( * ) Notice: Subject to any disclaimer, the term of this patent is extended or adjusted under 35 U.S.C. 154(b) by 582 days.

(21) Appl. No.: 12/899,644

(22) Filed: Oct. 7, 2010

(65) Prior Publication Data
US 2012/0085433 A1    Apr. 12, 2012

(51) Int. Cl.
*F16K 35/10* (2006.01)
*F16K 35/06* (2006.01)

(52) U.S. Cl.
CPC ........................ *F16K 35/06* (2013.01)
USPC ............... 137/382; 137/383; 70/178

(58) Field of Classification Search
USPC ........ 137/382, 383, 385, 384.2, 384.4, 384.6, 137/384.8; 70/32, 34, 175, 176, 177, 178, 70/179, 180, 33, 164, 386
See application file for complete search history.

(56) References Cited

U.S. PATENT DOCUMENTS

| | | | | |
|---|---|---|---|---|
| 822,025 | A * | 5/1906 | Sisco .............................. | 137/382 |
| 1,067,549 | A * | 7/1913 | Quigley .......................... | 70/177 |
| 1,131,821 | A * | 3/1915 | Campbell ...................... | 137/382 |
| 1,744,984 | A * | 1/1930 | Page ................................ | 70/34 |
| 1,890,744 | A * | 12/1932 | Noonan ............................ | 70/34 |
| 3,946,581 | A * | 3/1976 | Weeks et al. ........................ | 70/6 |
| 4,407,146 | A | 10/1983 | Nielson, Jr. | |
| 4,458,510 | A | 7/1984 | Nielson | |
| 4,576,021 | A * | 3/1986 | Holden .............................. | 70/34 |
| 4,751,831 | A * | 6/1988 | Morris et al. ................... | 70/159 |
| 4,761,906 | A * | 8/1988 | Guevara ....................... | 42/70.11 |
| 4,817,663 | A * | 4/1989 | McAndrew ................... | 137/385 |
| 4,844,498 | A * | 7/1989 | Kerins et al. .................. | 280/504 |
| 5,007,258 | A * | 4/1991 | Mahaney ........................ | 70/159 |
| 5,086,631 | A | 2/1992 | Agbay | |
| 5,638,857 | A * | 6/1997 | Alcumbrack .................. | 137/377 |
| 6,170,306 | B1 * | 1/2001 | Kitley et al. ..................... | 70/178 |
| 6,209,575 | B1 * | 4/2001 | Graziano et al. .............. | 137/383 |
| 6,994,106 | B1 * | 2/2006 | Hackley et al. ............... | 137/385 |
| 2002/0157433 | A1* | 10/2002 | Wadsworth, Jr. ............... | 70/177 |

* cited by examiner

*Primary Examiner* — Craig Schneider
*Assistant Examiner* — Jonathan Waddy
(74) *Attorney, Agent, or Firm* — McCormick, Paulding & Huber LLP

(57) ABSTRACT

A valve lock assembly includes a cover for selective placement over a valve. The cover has opposing sidewalls, each sidewall including at least one cover aperture. The assembly further includes a strap to secure the cover to the valve, the strap having opposing end portions each of which include at least one strap aperture. A locking pin is to be placed through both the strap apertures and the cover apertures when they are aligned. The assembly also includes a lock body, which features a first bore to receive the locking pin, and a second bore which receives a locking mechanism that prevents removal of the locking pin from the lock body. The lock body is freely rotatable about the locking pin so that the valve lock assembly may be installed or removed from a wide range of angles.

18 Claims, 6 Drawing Sheets

VALVE LOCK ASSEMBLY

FIELD OF THE INVENTION

The present invention relates generally to a valve lock assembly and more particularly to a valve lock assembly that is highly tamper resistant and easy to install.

BACKGROUND OF THE INVENTION

Utilities, such as water, are provided to customers through lines that include valves. These valves, which are commonly referred to as "stops" or "cocks," are used to control the flow of water through the line. Such valves are well known and generally include a body portion having an inlet and outlet that are separated by a rotatable plug. The plug has a handle or knob that may be rotated to control fluid flow.

As will be appreciated, it is generally desirable to secure such utility valves so that they cannot be opened to provide gas or water to an unauthorized customer. Typically, securing such valves involves partially enclosing the valve with a shroud so that the handle or knob cannot be accessed. The shroud is secured in place over the valve with, for example, a pad lock.

In a known locking assembly, a shroud is locked about a water valve through the use of a pad lock that includes an exposed, accessible shackle which, in some circumstances, may be cut with bolt cutters or the like. While such assemblies are generally quite effective at securing utility valves, a valve lock having a shackle portion that cannot be accessed to be cut is desirable.

Moreover, known valve locks are relatively difficult to remove or install, as they are located in subterranean water meter boxes that are relatively small and cramped. Known valve locks also have a somewhat limited range of motion when installed making insertion of a key challenging, particularly in the cramped confines of a meter box.

Known valve locks also include shrouds that are relatively expensive to manufacture, as they must be stamped, folded and then welded to form a box. As will be appreciated, a valve lock assembly that includes a shroud or cover that provides an ease of manufacture is desirable.

SUMMARY OF THE INVENTION

It is an object of the present invention to provide a valve lock assembly.

It is an additional object of the present invention to provide a valve lock assembly that is highly tamper resistant.

It is an additional object of the present invention to provide a valve lock assembly that is easy to install and remove.

It is an additional object of the present invention to provide a valve lock assembly that may be easily manufactured.

An embodiment of the inventive valve lock assembly includes a cover for selective placement over a valve. The cover has opposing sidewalls, each sidewall including at least one cover aperture. The assembly further includes a strap to secure the cover to the valve, the strap having opposing end portions each of which include at least one strap aperture. A locking pin is placed through both the strap apertures and the cover apertures when they are aligned. The assembly also includes a lock body, which features a first bore to receive the locking pin, and a second bore which receives a locking mechanism that prevents removal of the locking pin from the lock body. The lock body is freely rotatable about the locking pin so that the valve lock assembly may be installed or removed from a wide range of angles.

An addition embodiment of the inventive valve lock assembly includes a cover for selective placement over a valve, the cover having opposing sidewalls each of which includes at least one cover aperture. The assembly further includes a strap having opposing end portions each of which include at least one strap aperture. A locking pin which may be placed through both the strap apertures and the cover apertures, when the strap and cover apertures are aligned, is also included. The assembly further includes a lock body having both a through bore to receive the locking pin and a blind bore. A locking mechanism is also included which is received by the blind bore to prevent removal of the locking pin from the lock body. The lock body is freely rotatable about the locking pin so that the valve lock assembly may be installed or removed from a range of angles and the cover at least partially covers the locking pin thereby protecting it from tampering.

Yet another embodiment of the inventive valve assembly includes a cover for selective placement over a valve. The cover having opposing sidewalls, each sidewall including a plurality of cover apertures. The cover having an upper surface having two slots and two radiused edge portions. A substantially U-shaped strap having opposing end portions each of which include a plurality of strap apertures is also included. The end portions pass through the slots of the cover to attach the cover to a valve. The assembly also includes a locking pin, which may be placed through both the strap apertures and the cover apertures, when the strap and cover apertures are in alignment, to removably secure the cover to the valve. The locking pin having an end flange to limit its travel through the apertures. A circular lock body in further included which has a through bore to receive the locking pin. The lock body further included a blind bore. A barrel lock is included which is removably received by the blind bore to prevent removal of the locking pin from the lock body. The lock body is freely rotatable about the locking pin so that the valve lock assembly may be installed or removed from a range of angles and the cover at least partially covers the locking pin thereby protecting it from tampering.

DETAILED DESCRIPTION OF THE INVENTION

Figure 1:
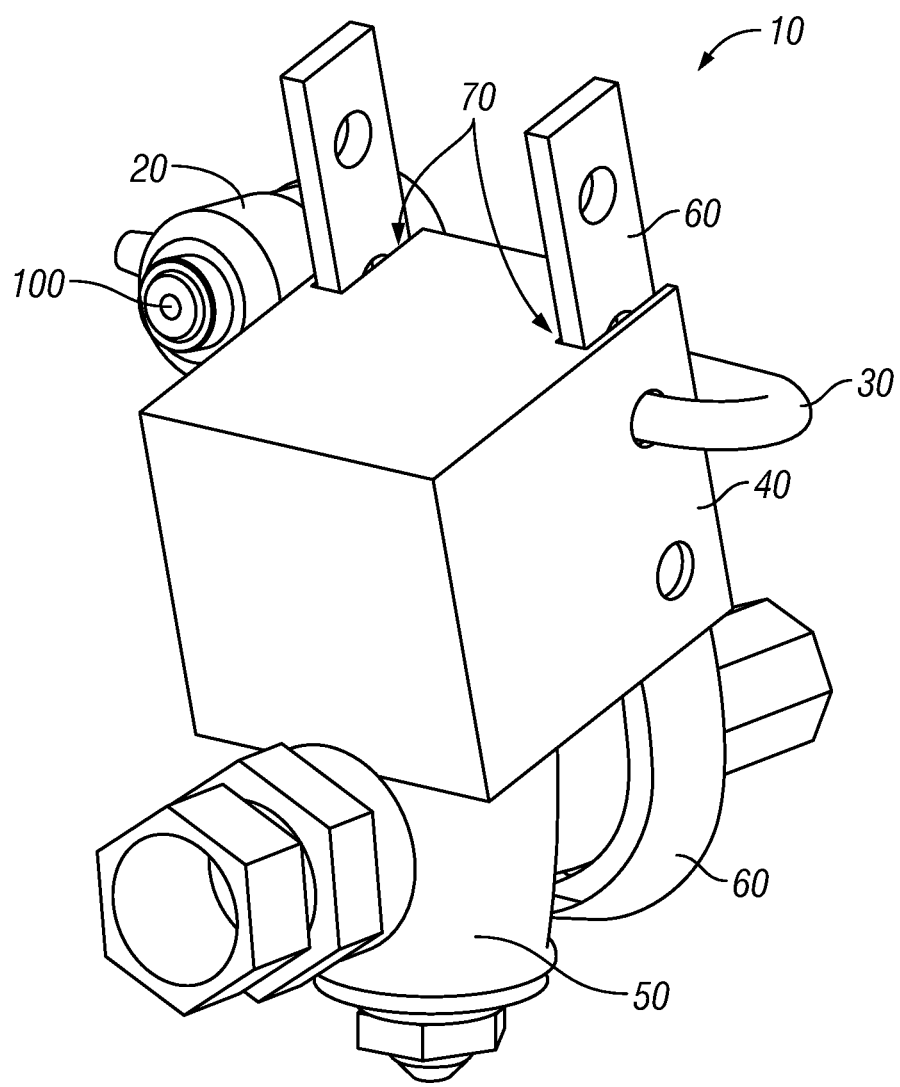
FIG. 1 is a perspective view of a prior art valve lock assembly.
Figure 2:
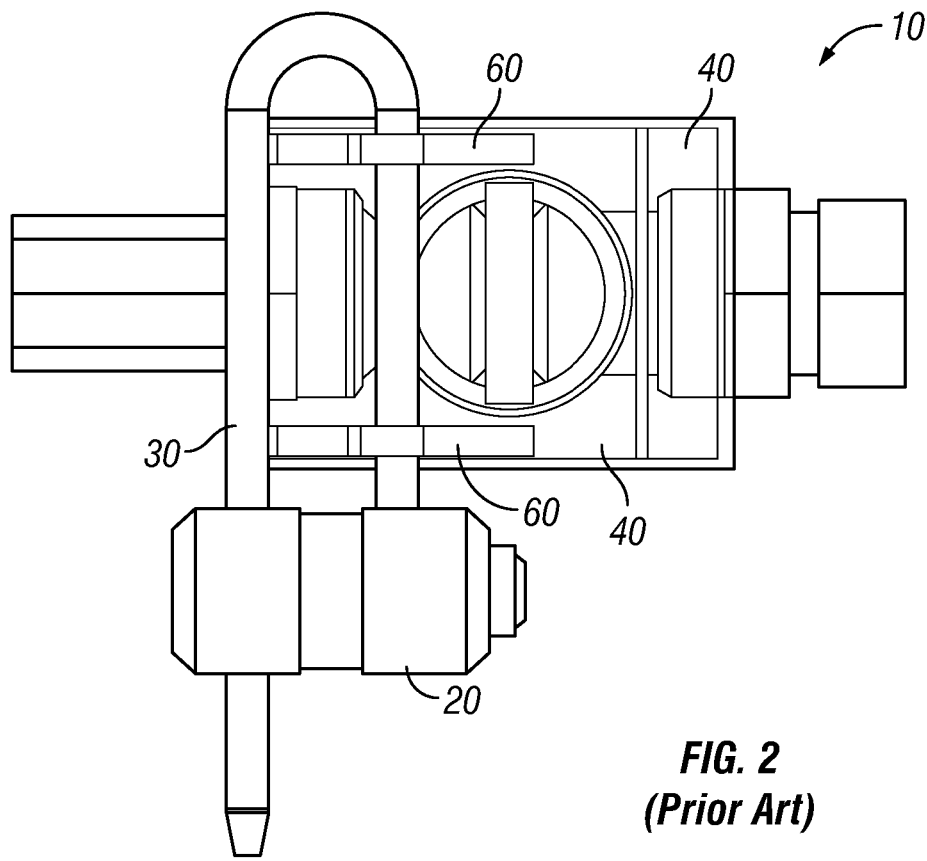
FIG. 2 is a top view of the prior art assembly of FIG. 1.
Figure 3:
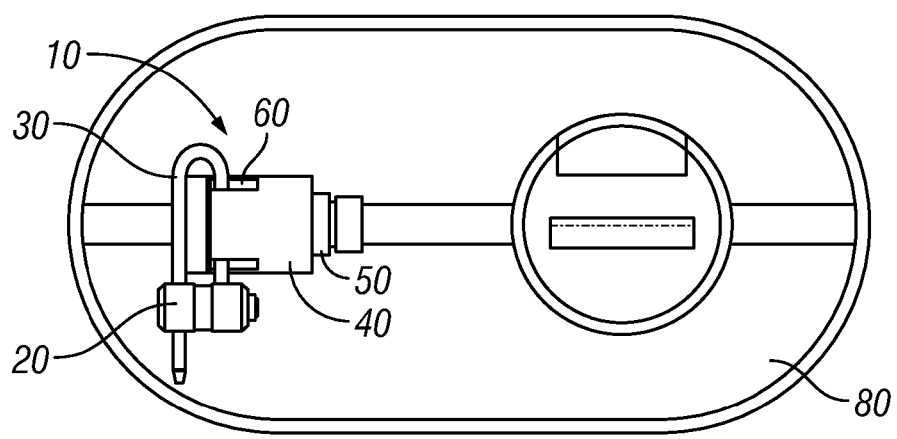
FIG. 3 is an additional top view of the prior art assembly of FIG. 1 depicting the assembly within a subterranean water meter box.
Figure 4:
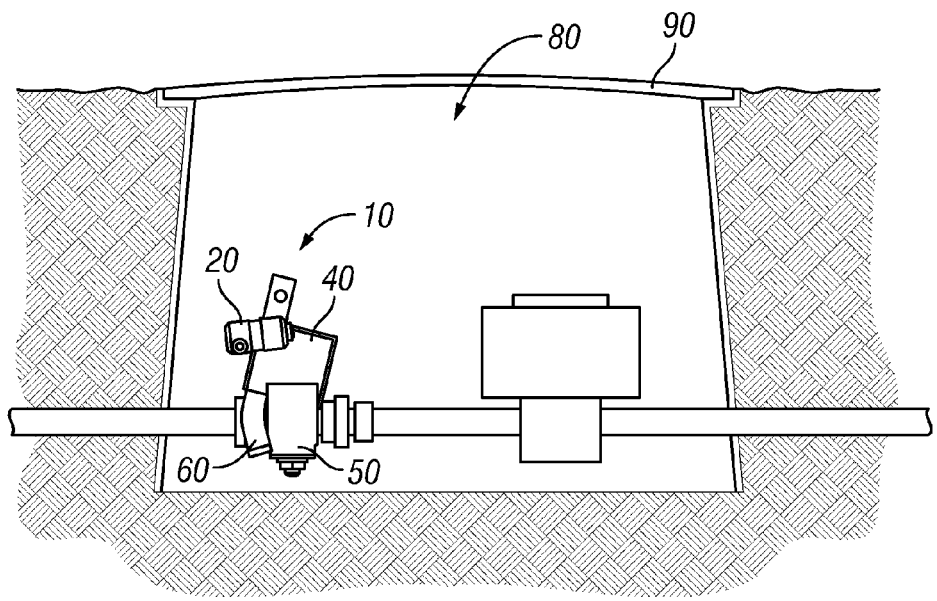
FIG. 4 is a side view of the prior art assembly and subterranean water meter box of FIG. 3.

FIGS. 1-4 depict a known valve lock assembly 10 that is used to secure water meter valves 50. As shown in FIGS. 3 and 4, such valves 50 are housed within water meter boxes 80 that are located underground. In use, the valve assembly 10 is installed over the valve 50 within the subterranean water meter box 80, which is then further secured with a removable cover 90.

In particular, the valve lock assembly 10 includes a shroud 40 that is secured over a valve 50 through the use of a strap portion 60, which extends through slots 70 in an upper surface of the shroud 40 (FIGS. 1 and 2). The strap 60 and shroud 40 are secured together, and over the valve 50, through a pad lock 20 which features a relatively long shackle 30 that is inserted through aligned apertures in the shroud 40 and strap 60 and locked.

A potential drawback of this known valve lock assembly 10 is that when the water meter box cover 90 is removed, the shackle 30 of the pad lock 20 is exposed. As will be appreciated, the exposed shackle 30 may be cut with bolt cutters or the like and the assembly 10 may be removed from the valve 50. The valve 50 can then be manipulated to initiate the flow of water.

Moreover, as shown in FIG. 4, the valve 50 is located in close proximity to a bottom surface of the meter box 80. As such, a service person must get down on their knees and lean into the meter box 80 to access valve 50. The depicted valve lock assembly 10 does not mitigate the already challenging installation environment presented by the meter box 80. Indeed, the relatively large size of the pad lock 20 and shackle 30, as well as the limited range of motion of the pad lock 20 make installation and removal difficult.

In particular, as shown in FIG. 1, the degree of rotation of the pad lock 20 is limited by the shackle 30 contacting upper terminal ends of the strap 60. As shown, the pad lock 20 cannot be rotated such that the key opening 100 faces upward. Accordingly, an installer must insert a key into the pad lock 20 from an angle that, given the confines of the meter box 80, can be awkward and difficult.

As discussed in greater detail below, the inventive valve lock assembly addresses these potential issues and more.

Figure 5:
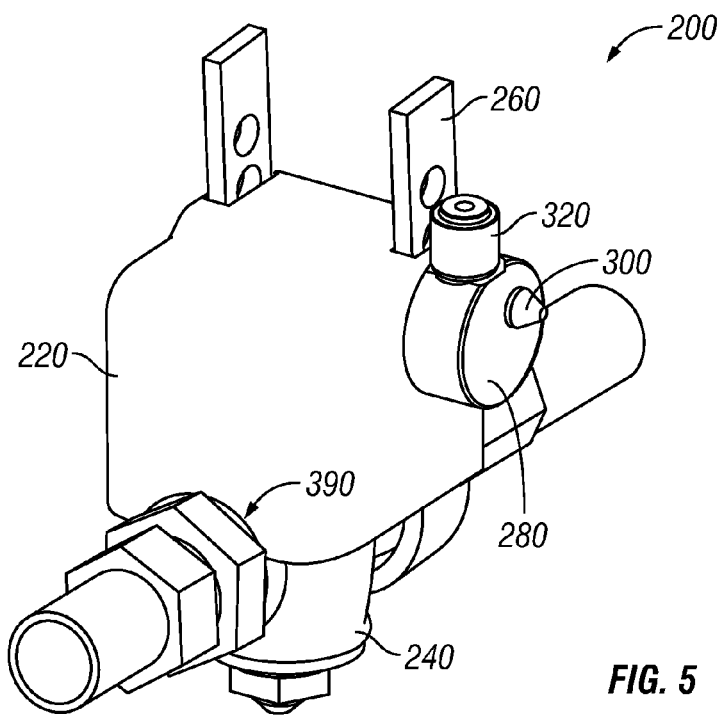
FIG. 5 perspective view of an assembled valve lock in accordance with an embodiment of the present invention.
Figure 6:
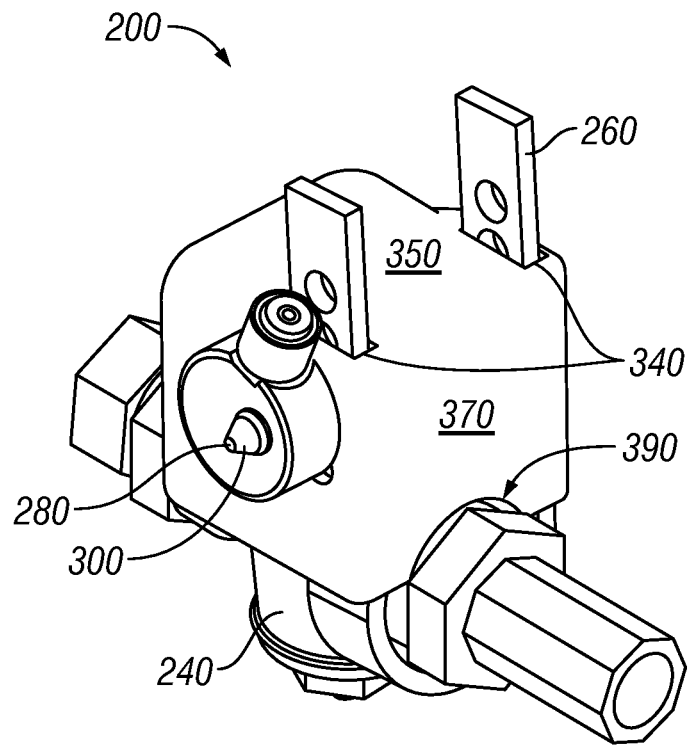
FIG. 6 is a perspective view of a reverse side of the assembled valve lock of FIG. 5.

Turning now to FIG. 5 a valve lock assembly 200 in accordance with an embodiment of the present invention is shown. The assembly 200 generally includes a cover 220, which is placed over a valve 240, a substantially U-shaped strap 260, a lock body 280, and a locking pin 300. The assembly 200 further includes a locking mechanism, such as a barrel lock 320, which, for example, may be the lock disclosed in U.S. Pat. No. 5,086,631, which is hereby incorporated by reference in its entirety.

Figure 7:
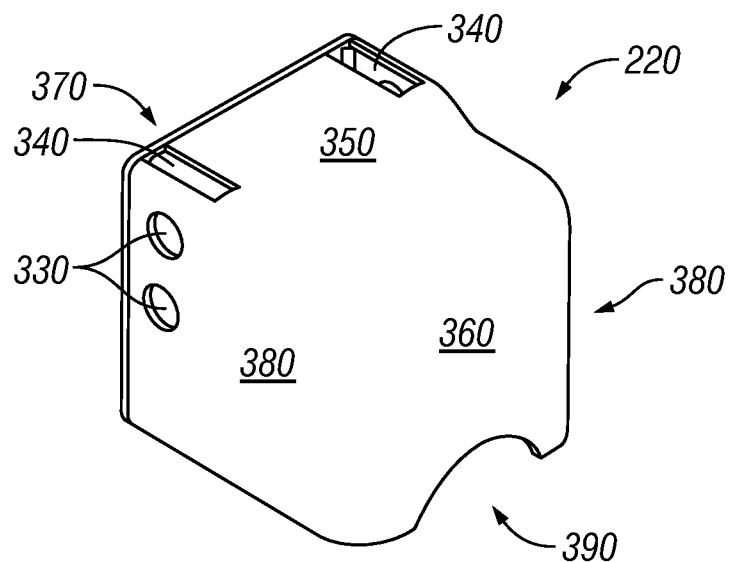
FIG. 7 is a perspective view of a lock cover of the valve lock of FIG. 5.

Referring now to both FIGS. 5 and 7, the cover 220 includes several apertures 330 that are formed in the sidewalls 380. The apertures facilitate passage of the locking pin 300 so secure the cover 220 and strap 260 to a valve 240. The cover 220 further includes two slots 340 which allow the ends of the strap 260 to extend through the cover 220 so that the cover 220 may be in relatively tight registration with the valve 240.

As will be appreciated, the cover 220 has five walls, a top wall 350, which contains the slots 340, a front wall 360, a rear wall 370, and two sidewalls 380. The cover 220 is open on the bottom so that it may be placed over a valve 240. The front and rear walls 360, 370, both include concave, radiused edges 390, that are configured to receive curved surfaces of the valve 240 (FIG. 5).

In one embodiment, the cover 220 is preferably manufactured from a one-piece stamping. As stated previously, known valve locks include shrouds, such as shroud 40 (FIGS. 1-4), which are manufactured through a relatively complex multi-step process. This process involves stamping, folding and welding the shroud 40 into a box. The cover 220, however, is preferably manufactured by one-piece stamping thereby avoiding the subsequent folding and welding and providing an ease of manufacture, and an associated cost savings, not presently available with known valve locks.

As will be appreciated, the cover 220 should be manufactured from a suitably hard material, such as, for example, hardened steel.

Figure 8:
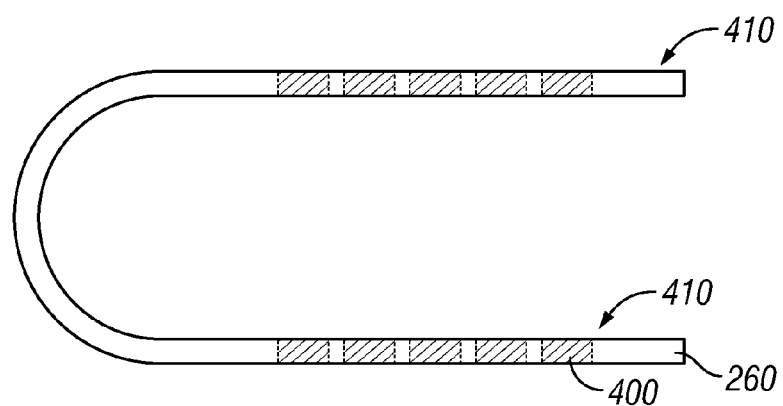
FIG. 8 is a top view of a strap portion of the valve lock of FIG. 5.
Figure 9:
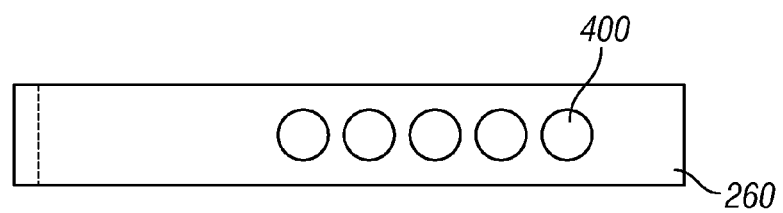
FIG. 9 is a side view of the strap portion of FIG. 8.

Turning now to FIGS. 8 and 9, the inventive assembly includes a substantially U-shaped strap 260. As shown, the strap 260 preferably includes a series of apertures 400 that are spaced apart from each other and extend longitudinally along the parallel portions 410 of the strap 260. The strap apertures 400 on each of the parallel portions are aligned with one another so that the locking pin 300 may pass through them. The straps feature multiple apertures 400 that are spaced apart to allow the assembly to be placed over valves of varying sizes.

In use, the strap 260 allows the cover 220 to be removably secured to the valve 240 by inserting the end portions of the strap 260 through the slots 340 of the cover. The strap apertures 400 are then aligned with the cover apertures 330 and a locking pin 300 (FIG. 10) is then placed through the aligned cover and strap apertures 330, 400 and secured via the lock body 280 and barrel lock 320.

Figure 10:
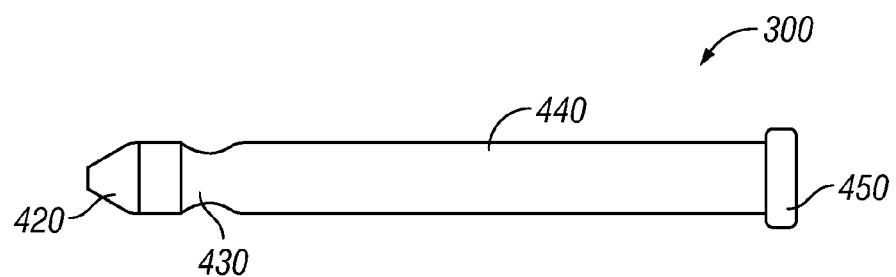
FIG. 10 is a side view of a locking pin of the valve lock of FIG. 5.

The locking pin 300 is shown in detail in FIG. 10. As depicted, the locking pin 300 has a head portion 420, a neck portion 430 having a reduced diameter, a body portion 440, and an end flange 450. The locking pin 300 is sized such that the head, neck and body portions 420, 430, 440, will pass through both the cover apertures 330 and the strap apertures 400. The end flange 450, however, has a circumference greater than that of the apertures 330, 400 so that it may not pass through. As such, the end flange 450 limits the travel of the locking pin 300 through the apertures.

Figure 11:
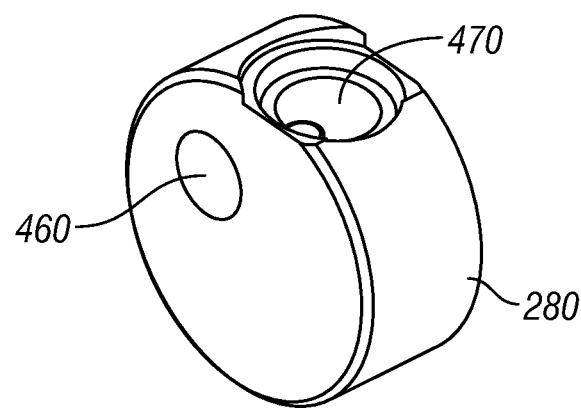
FIG. 11 is a perspective view of a lock body of the valve lock of FIG. 5.
Figure 12:
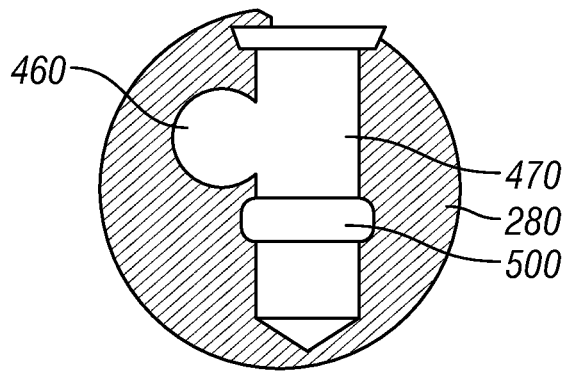
FIG. 12 is a sectioned view of the lock body of FIG. 11.

As stated above, in use, the locking pin 300 is inserted into a through bore 460 in the substantially circular lock body 280. Referring to FIGS. 11 and 12, the lock body 280 includes both through bore 460, that accommodates a portion of the locking pin, and a blind bore 470 that is configured to receive a locking mechanism such as a barrel lock 320 (FIG. 5). The blind bore 470 and through bore 460 intersect in the center of the lock body 280 which is depicted in FIG. 12. The blind bore 470 also includes a channel 500 that is configured to receive locking balls of a barrel lock (not shown).

When the locking pin is inserted into the lock body, the flange end of the pin limits its travel such that the neck portion 430 of the pin is located at the point of intersection of the bores 460, 470 in the lock body 280. The reduced size of the neck portion allows a barrel lock 320, for example, to be inserted into the lock body and locked in place thereby preventing the pin from being removed from the lock body 280. As will be appreciated, the larger head portion 420 cannot pass by the barrel lock 320 when it is in bore 470, and the locking pin 300 cannot be removed.

The neck portion 430 of the pin need not extend annularly around a circumference of the locking pin 300. Alternatively, in another embodiment, the neck portion 430 may be a notch or cutaway in the pin that is sized or shaped to accommodate a barrel lock while preventing pin removal when assembled as described above.

An important aspect of the present invention is that the lock body 280 may freely rotate about the locking pin. This is significant, in that it is often difficult to install a lock on a valve that is located in a subterranean box having a restricted area. Known designs, such as the valve lock 10 depicted in FIGS. 1-4, include a pad lock 20 that has a limited range of motion making it more difficult to install a locking mechanism such as a barrel lock. In particular, known designs do not permit a locking mechanism to be installed in a vertical position, i.e., the position most conducive to installation.

To this end, it will be appreciated that the lock body 280 need not be round as shown. Other shapes may be used as long as the body 280 allows for free rotation about a locking pin when assembled as described herein.

Moreover, known valve locks include relatively long pad locks that are difficult to install in the limited space of a box. The inventive assembly 200 includes a relatively compact and short locking pin 300 with an equally compact lock body 280 that are spaced apart from the walls of the box to an extent greater than with known valve locks.

Another important feature of the present invention is that it is tamper resistant. That is, known valve locks include a pad lock 20 with a large shackle 30. As shown in FIGS. 2 and 3, the shackle 30 is exposed and, in certain circumstance, may be cut by a bolt cutter or pried with a pry bar. In contrast, the inventive valve lock assembly 200 includes a lock body 280 that is close fitting to the cover 220 making it difficult to pry and impossible to cut with bolt cutters as the locking pin 300 is not exposed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described valve lock assembly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A valve lock assembly, said lock assembly comprising:
 a cover for selective placement over a valve, said cover having opposing sidewalls, each sidewall including at least one cover aperture;
 a locking pin, which may be placed through said cover apertures to removably attach said cover to said valve, said locking pin having a head portion, a neck portion having a reduced diameter, a body portion, and an end flange integrally formed with said body portion, said end flange limiting travel of said locking pin through said cover aperture, said locking pin being substantially linear throughout its length;
 a lock body, said lock body having a first through bore extending entirely through said lock body from one external side of said lock body to another external side of said lock body to receive said locking pin, said lock body further including a second blind bore, said second blind bore being oriented generally perpendicular to said first through bore and intersecting said first through bore within said lock body; and
 a locking mechanism, said locking mechanism being removably received by said second bore to prevent removal of said locking pin from said lock body;
 wherein said lock body is freely rotatable about said locking pin so that said valve lock assembly may be installed or removed from a range of angles; and
 wherein said body portion of said locking pin is substantially entirely housed within said cover to prevent access to said body portion.

2. The valve lock assembly of claim 1, wherein said cover at least partially covers said locking pin thereby protecting it from tampering.

3. The valve lock assembly of claim 1, wherein said valve lock further comprises:
 a strap having opposing end portions each of which include at least one strap aperture; and
 wherein said locking pin may be placed through both said strap apertures and said cover apertures, when said strap apertures and cover apertures are aligned, to removably attach said cover to said valve.

4. The valve lock assembly of claim 1, wherein said at least one cover aperture is a plurality of spaced apart apertures that allow said valve lock assembly to be adjusted to fit valves of varying sizes.

5. The valve lock assembly of claim 3, wherein said at least one strap aperture is a plurality of spaced apart apertures that allow said valve lock assembly to be adjusted to fit valves of varying sizes.

6. The valve lock assembly of claim 3, wherein said strap is substantially U-shaped and said opposing end portions are substantially parallel to one another.

7. The valve lock assembly of claim 6, wherein said cover has two slots that receive said opposing end portions of said strap to removably attach said cover to said valve.

8. The valve lock assembly of claim 1, wherein said cover includes radiused edge portions.

9. The valve lock assembly of claim 1, wherein said locking mechanism is a barrel lock.

10. A valve lock assembly, said lock assembly comprising:
a cover for selective placement over a valve, said cover having opposing sidewalls, each sidewall including at least one cover aperture;
a strap having opposing end portions each of which include at least one strap aperture;
a locking pin which may be placed through both said strap apertures and said cover apertures, when said strap apertures and cover apertures are aligned, to removably attach said cover to said valve, said locking pin having a head portion, a neck portion having a reduced diameter, a body portion, and an end flange integrally formed with said body portion, said end flange limiting travel of said locking pin through said cover aperture, said locking pin being substantially linear throughout its length;
a lock body, said lock body having a through bore extending entirely through said lock body from one external side of said lock body to another external side of said lock body to receive said locking pin, said lock body further including a blind bore extending generally perpendicular to said through bore and intersecting said through bore within said lock body; and
a locking mechanism, said locking mechanism being removably received by said blind bore to prevent removal of said locking pin from said lock body;
wherein said lock body is freely rotatable about said locking pin so that said valve lock assembly may be installed or removed from a range of angles and said cover at least partially covers said locking pin thereby protecting it from tampering; and
wherein said body portion of said locking pin is substantially entirely housed within said cover to prevent access to said body portion.

11. The valve lock assembly of claim 10, wherein said at least one cover aperture is a plurality of spaced apart apertures that allow said valve lock assembly to be adjusted to fit valves of varying sizes.

12. The valve lock assembly of claim 10, wherein said at least one strap aperture is a plurality of spaced apart apertures that allow said valve lock assembly to be adjusted to fit valves of varying sizes.

13. The valve lock assembly of claim 10, wherein said strap is substantially U-shaped and said opposing end portions are substantially parallel to one another.

14. The valve lock assembly of claim 10, wherein said cover has two slots that receive said opposing end portions of said strap to removably attach said cover to said valve.

15. The valve lock assembly of claim 10, wherein said cover includes radiused edge portions.

16. The valve lock assembly of claim 10, wherein said locking mechanism is a barrel lock.

17. A valve lock assembly, said lock assembly comprising:
a cover for selective placement over a valve, said cover having opposing sidewalls, each sidewall including a plurality of cover apertures, said cover having an upper surface having two slots, and two radiused edge portions;
a substantially U-shaped strap having opposing end portions each of which include a plurality of strap apertures, said end portions passing through said slots of said cover to attach said cover to said valve;
a locking pin which may be placed through both said strap apertures and said cover apertures, when said strap and cover apertures are in alignment, to removably secure said cover to said valve, said locking pin having a head portion, a neck portion having a reduced diameter, a body portion, and an end flange integrally formed with said body portion to limit travel of said locking pin through said apertures, said locking pin being substantially linear throughout its extent;
a lock body, said lock body having a through bore extending entirely through said lock body from one external side of said lock body to another external side of said lock body to receive said locking pin, said lock body further including a blind bore extending generally perpendicular to said through bore and intersecting said through bore within said lock body; and
a barrel lock, said barrel lock being removably received by said blind bore to prevent removal of said locking pin from said lock body;
wherein said lock body is freely rotatable about said locking pin so that said valve lock assembly may be installed or removed from a range of angles and said cover at least partially covers said locking pin thereby protecting it from tampering; and
wherein said body portion of said locking pin is substantially entirely housed within said cover to prevent access to said body portion.

18. The valve lock assembly of claim 17, wherein said barrel lock is a rotating disk barrel lock.

* * * * *